(12) United States Patent
Gao et al.

(10) Patent No.: US 9,106,137 B2
(45) Date of Patent: Aug. 11, 2015

(54) DIRECT CURRENT VOLTAGE GENERATING APPARATUS FOR GENERATING STABLE DC VOLTAGES

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Zhi-Yong Gao, Wuhan (CN); Ting-Ting Wu, Wuhan (CN); Yu-Lin Liu, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 138 days.

(21) Appl. No.: 13/862,594

(22) Filed: Apr. 15, 2013

(65) Prior Publication Data
US 2013/0314960 A1   Nov. 28, 2013

(30) Foreign Application Priority Data

May 25, 2012   (CN) .......................... 2012 1 0165264

(51) Int. Cl.
*H01H 9/54* (2006.01)
*H01H 33/59* (2006.01)
*H02M 7/217* (2006.01)
*H02M 7/06* (2006.01)
*H02M 1/00* (2007.01)

(52) U.S. Cl.
CPC ................ *H02M 7/217* (2013.01); *H02M 7/06* (2013.01); *H02M 2001/0045* (2013.01)

(58) Field of Classification Search
USPC .......... 307/139, 140; 323/299, 300, 303, 312, 323/908; 363/89, 124
See application file for complete search history.

(56) References Cited

U.S. PATENT DOCUMENTS

| 3,345,551 | A | * | 10/1967 | Slavin et al. | 388/839 |
| 4,685,046 | A | * | 8/1987 | Sanders | 363/89 |
| 4,947,313 | A | * | 8/1990 | Nakamura | 363/143 |
| 5,307,257 | A | * | 4/1994 | Fukushima | 363/53 |
| 7,196,917 | B2 | * | 3/2007 | O'Loughlin | 363/41 |
| 2008/0048752 | A1 | * | 2/2008 | Hung | 327/318 |

* cited by examiner

*Primary Examiner* — Adolf Berhane
*Assistant Examiner* — Gary Nash
(74) *Attorney, Agent, or Firm* — Novak Druce Connolly Bove + Quigg LLP

(57) ABSTRACT

An exemplary direct current (DC) voltage generating apparatus for generating stable DC voltages includes a voltage conversion circuit, a voltage control circuit, and a voltage regulating circuit. The voltage conversion circuit receives an alternating current (AC) voltage, and converts the AC voltage to a first DC voltage. The voltage control circuit receives the first DC voltage, and converts the first DC voltage to a second DC voltage and a control signal. The voltage regulating circuit receives the control signal, and regulates the second DC voltage to a stable second DC voltage at the voltage control circuit according to the control signal.

14 Claims, 2 Drawing Sheets

DIRECT CURRENT VOLTAGE GENERATING APPARATUS FOR GENERATING STABLE DC VOLTAGES

BACKGROUND

1. Technical Field

The present disclosure relates to direct current (DC) voltage generating apparatus for generating stable DC voltages.

2. Description of Related Art

DC voltage is widely used to provide power for motherboards and fans during tests in the factory. However, the DC power adapter usually has a large size, occupies large amounts of space, and is very expensive, all of which factors increase the manufacturing cost.

Therefore there is a need for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
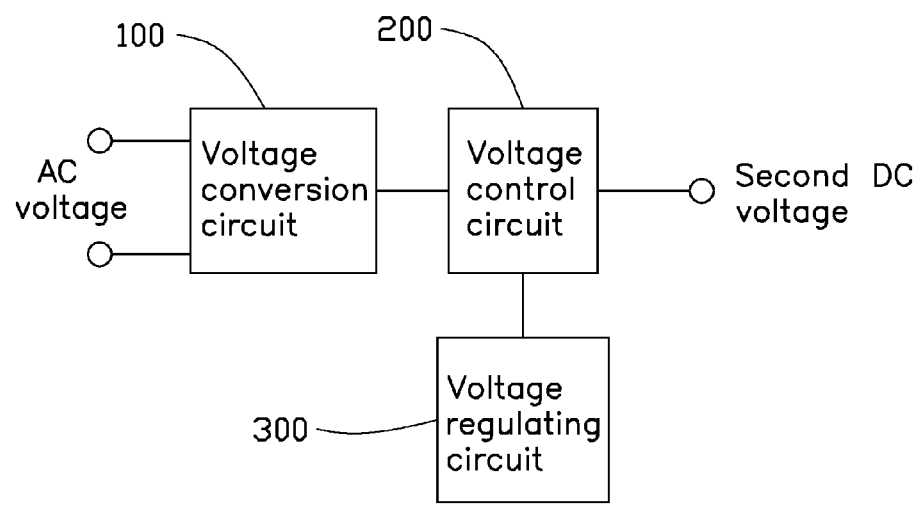
FIG. 1 is a block view of an embodiment of a DC voltage generating apparatus.

FIG. 1 illustrates a block view of an embodiment of a direct current (DC) voltage generating apparatus for generating stable DC voltages, in accordance with one embodiment. The DC voltage generating apparatus includes a voltage conversion circuit 100, a voltage control circuit 200, and a voltage regulating circuit 300. The voltage conversion circuit 100 receives an alternating current (AC) voltage, and converts the AC voltage to a first DC voltage. The voltage control circuit 200 receives the first DC voltage, and outputs a second DC voltage and a control signal. The voltage regulating circuit 300 receives the control signal, and regulates the second DC voltage to output a stable second DC voltage according to the control signal.

Figure 2:
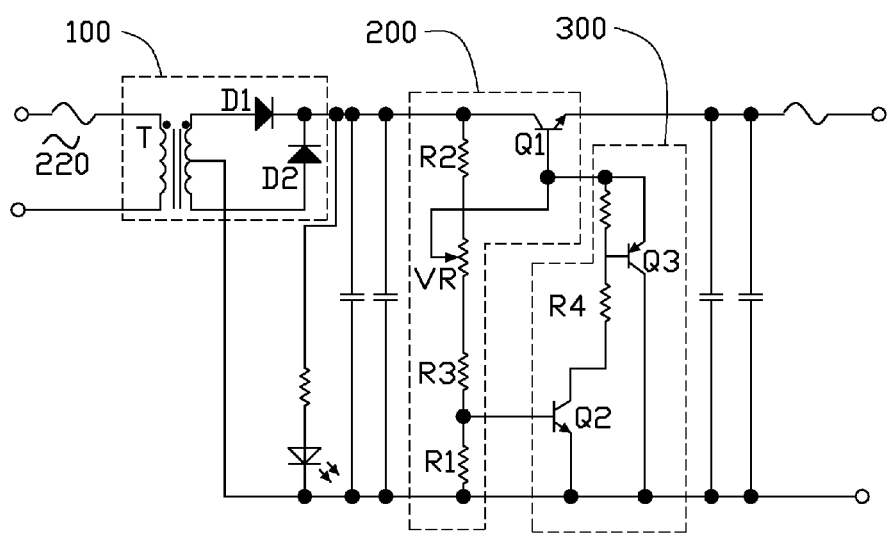
FIG. 2 is a circuit view of the DC voltage generating apparatus of FIG. 1.

FIG. 2 illustrates a circuit view of the DC voltage generating apparatus, in accordance with one embodiment. The voltage conversion circuit 100 includes a transformer T, a first diode D1, and a second diode D2. The transformer T includes two input terminals and two output terminals. The two input terminals of the transformer T receive the AC voltage. The two output terminals of the transformer T are electrically connected to anodes of the first diode D1 and the second diode D2 respectively. Cathodes of the first diode D1 and the second diode D2 are electrically connected to output the first DC voltage. In one embodiment, the AC voltage is 220V, and the first DC voltage is +35V.

The voltage control circuit 200 includes a first transistor Q1, a variable resistor VR, a first resistor R1, a second resistor R2, and a third resistor R3. The variable resistor VR includes a first terminal, a second terminal, and an adjusting terminal The adjusting terminal of the variable resistor VR is electrically connected to a base of the first transistor Q1. The first terminal of the variable resistor VR is electrically connected to cathodes of the first diode D1 and the second diode D2 via the second resistor R2. The second terminal of the variable resistor VR is grounded via the third resistor R3 and the first resistor R1 connected in series. A collector of the first transistor Q1 is electrically connected to cathodes of the first diode D1 and the second diode D2. An emitter of the first transistor Q1 outputs the second DC voltage. In one embodiment, an adjusting scope of the variable resistor VR is from 0 ohm to 250 kilo ohm. Resistances of the first resistor R1 and the third resistor R3 are 10 kilo ohm, and a resistance of the second resistor R2 is 200 ohm.

The voltage regulating circuit 300 includes a second transistor Q2, a third transistor Q3, and a fourth resistor R4. A base of the second transistor Q2 is electrically connected to a connection point between the first resistor R1 and the third resistor R3. An emitter of the second transistor Q2 is grounded. A collector of the second transistor Q2 is electrically connected to a base of the third transistor Q3 via the fourth resistor R4.

A collector of the third transistor Q3 is grounded. An emitter of the third transistor Q3 is electrically connected to the base of the first transistor Q1. In one embodiment, the first transistor Q1 and the second transistor Q2 are NPN type transistors, and the third transistor Q3 is a PNP type transistor.

In use, the 220V AC voltage is decreased to a 35V AC voltage by the transformer T. The first diode D1 and the second diode D2 converts the 35V AC voltage to the +35V first DC voltage. A voltage on the variable resistor VR, the third resistor R3, and the first resistor R1 is greater than a voltage on the second resistor R2. A voltage on the base of the first transistor Q1 is greater than a turning on voltage of the first transistor Q1. The first transistor Q1 turns on. The emitter of the first transistor Q1 outputs the second DC voltage. The adjusting terminal of the variable resistor VR is slid to a position wherein a voltage on the first resistor R1 is greater than a turning on voltage of the second transistor Q2. The second transistor Q2 turns on. A voltage on the base of the third transistor Q3 is pulled down to a low voltage level (i.e., ground).

The third transistor Q3 turns on. Voltages on collectors of the second transistor Q2 and the third transistor Q3 remain unchanged, which leads to the voltage on the base of the first transistor Q1 remaining unchanged. Therefore, the emitter of the first transistor Q1 outputs a stable second DC voltage. In one embodiment, the adjusting terminal of the variable resistor VR is slid to adjust a magnitude of the second DC voltage. An adjusting scope of the second DC voltage is from +3.5V to +35V.

Even though numerous characteristics and advantages of the present disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A direct current (DC) voltage generating apparatus for generating stable DC voltages comprising:

a voltage conversion circuit adapted to receive an alternating current (AC) voltage, and convert the AC voltage to a first DC voltage;

a voltage control circuit adapted to receive the first DC voltage, and convert the first DC voltage to a second DC voltage and a control signal; and a voltage regulating circuit adapted to receive the control signal, and regulate the second DC voltage to a stable second DC voltage at the voltage control circuit according to the control signal, wherein the voltage control circuit comprises a first transistor and a variable resistor; the variable resistor comprises an adjusting terminal; the voltage regulating circuit comprises a second transistor and a third transistor; the adjusting terminal of the variable resistor is slid to a position wherein the first transistor, the second transistor, and the third transistor turn on in order and an emitter of the first transistor outputs the stable second DC voltage.

2. The DC voltage generating apparatus of claim 1, wherein the voltage conversion circuit comprises a transformer, a first diode, and a second diode; the transformer comprises two input terminals and two output terminals; the two input terminals of the transformer receive the AC voltage; the two output terminals of the transformer are electrically connected to anodes of the first diode and the second diode respectively; and cathodes of the first diode and the second diode are electrically connected to output the first DC voltage.

3. The DC voltage generating apparatus of claim 2, wherein the voltage control circuit further comprises a first resistor; the variable resistor further comprises a first terminal and a second terminal; the adjusting terminal of the variable resistor is electrically connected to a base of the first transistor; the first terminal of the variable resistor is electrically connected to cathodes of the first diode and the second diode; the second terminal of the variable resistor is grounded via the first resistor; a collector of the first transistor is electrically connected to cathodes of the first diode and the second diode; and the emitter of the first transistor outputs the second DC voltage.

4. The DC voltage generating apparatus of claim 3, wherein a base of the second transistor is electrically connected to a connection point between the second terminal of the variable resistor and the first resistor; an emitter of the second transistor is grounded; a collector of the second transistor is electrically connected to a base of the third transistor; a collector of the third transistor is grounded; and an emitter of the third transistor is electrically connected to the base of the first transistor.

5. The DC voltage generating apparatus of claim 4, wherein the first transistor and the second transistor are NPN type transistors, and the third transistor is a PNP type transistor.

6. The DC voltage generating apparatus of claim 5, wherein an adjusting scope of the variable resistor is from 0 ohm to 250 kilo ohm; and a resistance of the first resistor is 10 kilo ohm.

7. The DC voltage generating apparatus of claim 6, wherein the first DC voltage is +35V; and an adjusting scope of the second DC voltage is from +3.5V to +35V.

8. A direct current (DC) voltage generating apparatus for generating stable DC voltages comprising:

a voltage conversion circuit adapted to receive an alternating current (AC) voltage, and convert the AC voltage to a first DC voltage;

a voltage control circuit adapted to receive the first DC voltage, and convert the first DC voltage to a second DC voltage and a control signal; and a voltage regulating circuit adapted to receive the control signal, and regulate the second DC voltage to a stable second DC voltage at the voltage control circuit according to the control signal; wherein the voltage control circuit comprises a first transistor; and an emitter of the first transistor outputs the stable second DC voltage when the first transistor is turned on, wherein the voltage control circuit further comprises a variable resistor; the variable resistor comprises an adjusting terminal; the voltage regulating circuit comprises a second transistor and a third transistor; the adjusting terminal of the variable resistor is slid to a position wherein the first transistor, the second transistor, and the third transistor turn on in order and the emitter of the first transistor outputs the stable second DC voltage.

9. The DC voltage generating apparatus of claim 8, wherein the voltage conversion circuit comprises a transformer, a first diode, and a second diode; the transformer comprises two input terminals and two output terminals; the two input terminals of the transformer receive the AC voltage; the two output terminals of the transformer are electrically connected to anodes of the first diode and the second diode respectively; and cathodes of the first diode and the second diode are electrically connected to output the first DC voltage.

10. The DC voltage generating apparatus of claim 9, wherein the voltage control circuit further comprises a first resistor; the variable resistor further comprises a first terminal and a second terminal; the adjusting terminal of the variable resistor is electrically connected to a base of the first transistor; the first terminal of the variable resistor is electrically connected to cathodes of the first diode and the second diode; the second terminal of the variable resistor is grounded via the first resistor; a collector of the first transistor is electrically connected to cathodes of the first diode and the second diode; and the emitter of the first transistor outputs the second DC voltage.

11. The DC voltage generating apparatus of claim 10, wherein a base of the second transistor is electrically connected to a connection point between the second terminal of the variable resistor and the first resistor; an emitter of the second transistor is grounded; a collector of the second transistor is electrically connected to a base of the third transistor; a collector of the third transistor is grounded; and an emitter of the third transistor is electrically connected to the base of the first transistor.

12. The DC voltage generating apparatus of claim 11, wherein the first transistor and the second transistor are NPN type transistors, and the third transistor is a PNP type transistor.

13. The DC voltage generating apparatus of claim 12, wherein an adjusting scope of the variable resistor is from 0 ohm to 250 kilo ohm; and a resistance of the first resistor is 10 kilo ohm.

14. The DC voltage generating apparatus of claim 13, wherein the first DC voltage is +35V; and an adjusting scope of the second DC voltage is from +3.5V to +35V.

* * * * *